(12) United States Patent
Windhab et al.

(10) Patent No.: US 6,576,470 B1
(45) Date of Patent: Jun. 10, 2003

(54) PROCESS AND FACILITY FOR EXAMINING CHEMICAL REACTIONS IN MINIATURIZED REACTORS ARRANGED PARALLEL TO EACH OTHER

(75) Inventors: Norbert Windhab, Hattersheim (DE); Christian Miculka, Frankfurt (DE); Hans-Ulrich Hoppe, Frankfurt (DE)

(73) Assignee: Aventis Research & Technologies GmbH & Co KG (DE)

( * ) Notice: Subject to any disclaimer, the term of this patent is extended or adjusted under 35 U.S.C. 154(b) by 0 days.

(21) Appl. No.: 09/242,199

(22) PCT Filed: Aug. 12, 1997

(86) PCT No.: PCT/EP97/04369

§ 371 (c)(1), (2), (4) Date: Nov. 22, 1999

(87) PCT Pub. No.: WO98/07026

PCT Pub. Date: Feb. 19, 1998

(30) Foreign Application Priority Data

Aug. 15, 1996 (DE) .......................................... 196 32 779

(51) Int. Cl.$^7$ ............................................. G01N 33/00
(52) U.S. Cl. .......................... 436/64; 422/68.1; 422/71; 422/139; 422/140; 422/141; 422/146; 422/159
(58) Field of Search .................. 422/68.1, 71, 139, 422/140, 141, 146, 159; 436/34

(56) References Cited

U.S. PATENT DOCUMENTS

| | | | |
|---|---|---|---|
| 3,431,077 A | | 3/1969 | Danforth |
| 4,099,923 A | | 7/1978 | Milberger |
| 4,629,903 A | * | 12/1986 | Giacobbe et al. ...... 250/227.11 |
| 5,266,270 A | | 11/1993 | Ajot et al. |
| 6,030,917 A | * | 2/2000 | Weinberg et al. ........... 502/104 |
| 6,136,274 A | * | 10/2000 | Nova et al. .................. 422/102 |
| 6,238,929 B1 | * | 5/2001 | Antonenko et al. ......... 436/180 |
| 6,242,542 B1 | * | 6/2001 | Beaudoin ..................... 526/87 |
| 6,245,865 B1 | * | 6/2001 | Lee et al. ..................... 526/65 |

* cited by examiner

*Primary Examiner*—Jill Warden
*Assistant Examiner*—Monique T. Cole
(74) *Attorney, Agent, or Firm*—Connolly Bove Lodge & Hutz LLP

(57) ABSTRACT

The invention pertains to a process for examining chemical reactions in the presence of potentially catalytical substances, wherein reactions are triggered in miniaturized reactors with volumes of 0.001 cm$^3$ to 1 cm$^3$ arranged parallel to each other, and the nature and amount of the reaction mixture are analyzed during the reaction time.

9 Claims, 3 Drawing Sheets

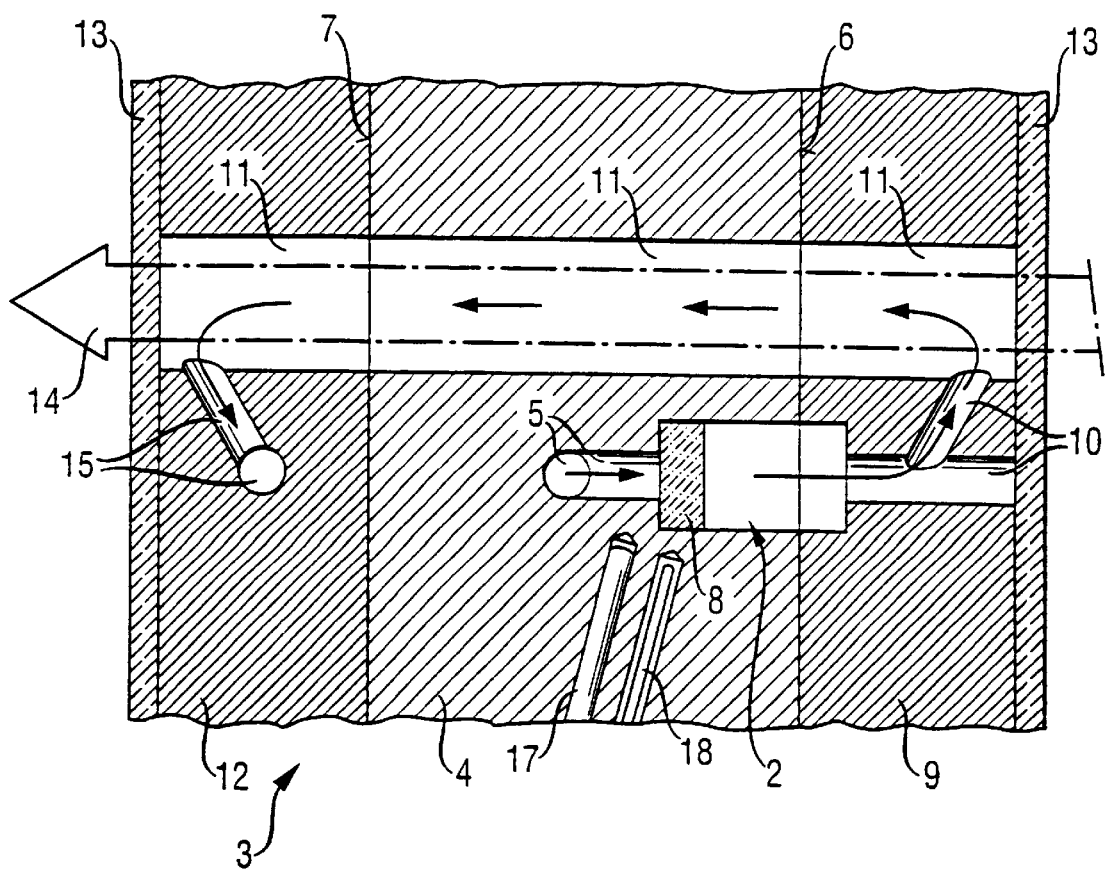

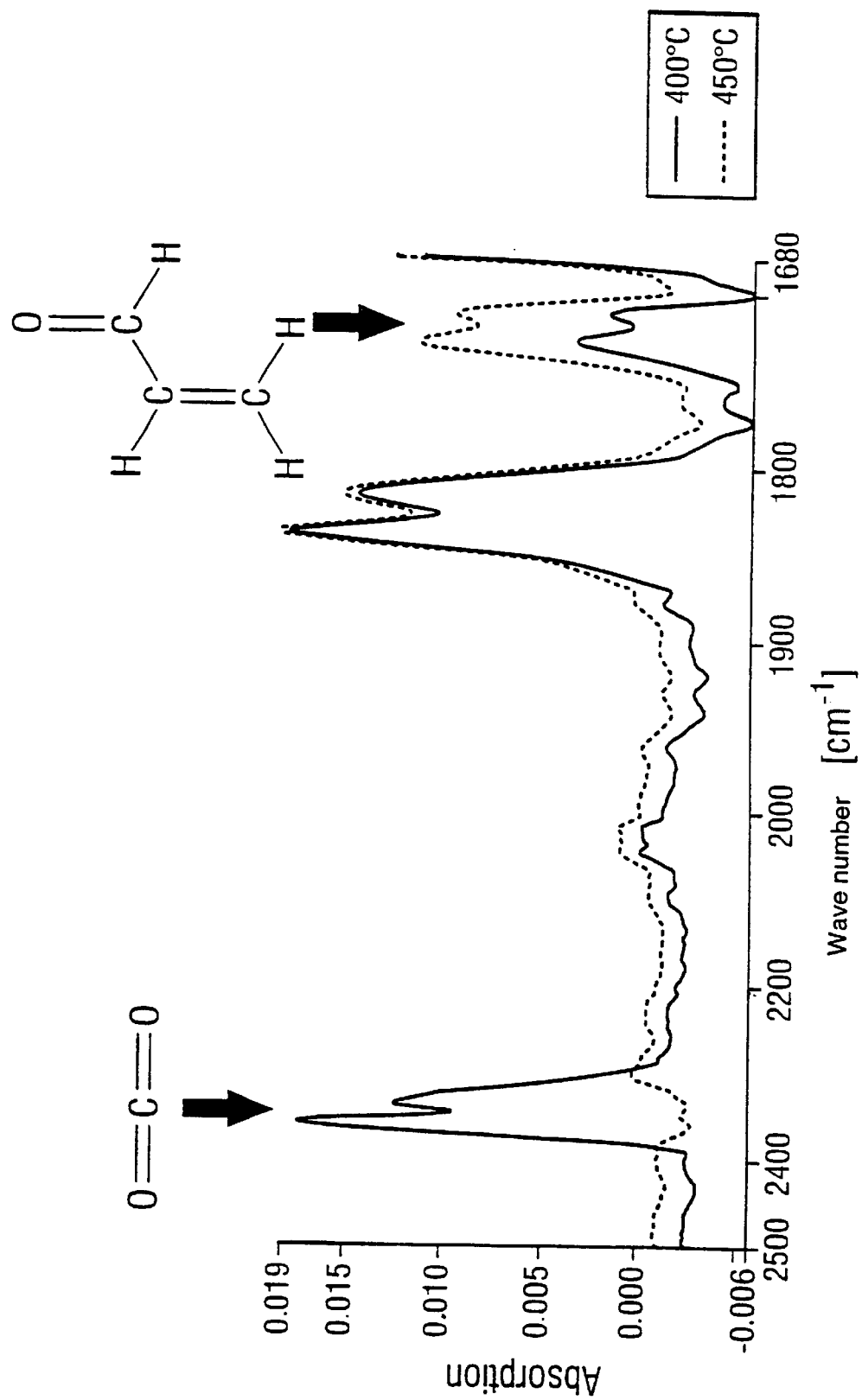
Fig. 3: Screening and optimization of a catalyst by on-line IR gas analysis in parallel reactors

PROCESS AND FACILITY FOR EXAMINING CHEMICAL REACTIONS IN MINIATURIZED REACTORS ARRANGED PARALLEL TO EACH OTHER

The invention relates to a process for the study of chemical reactions in the presence of potentially catalytic substances, in which the reactions are carried out in parallel in reactors. The invention further relates to an apparatus, in particular for carrying out this process, the apparatus having a plurality of parallel-connected reactors which are provided with feedlines and discharge lines.

Processes and apparatuses of said type are known and are used, inter alia, in the search for catalysts for the heterogeneous or homogeneous catalysis of industrial chemical processes.

However, most recently, novel techniques have made it posible to prepare substances in a great number, which could be potential catalysts for a multiplicity of chemical processes (P. G. Schultz et al., Science 1995, 1738). The study of this multiplicity of potential catalysts is scarcely possible any longer using the conventional series screening processes, since these screening processes are limited with respect to throughput and analytical resolution, as well as in reproducibility. Frequently, for pure activity screening, integral effects such as heating of the catalyst etc. are used completely inadequately without direct product mixture analysis or efficiency analysis. Furthermore, optimizing the conditions of catalyst activation and process procedure make special requirements of quantitative analytical processes and of the reproducibility of the reaction conditions.

The object underlying the invention was therefore to develop an inexpensive process or an inexpensive apparatus by which a multiplicity of chemical reactions can be studied in a short time and thus reproducible, qualitative and quantitative data can be obtained with respect to the composition of the different reaction mixtures and reaction products.

This object is achieved by a process of the type mentioned at the outset, which is characterized in that the reactions are carried out in miniaturized reactors and the reaction mixture or the reaction products are analyzed with respect to nature and amount during the reaction period.

The object is further achieved by an apparatus of said type, which is characterized in that the reactors are miniaturized, at a volume from the range from $0.001$ $cm^3$ to $1$ $cm^3$.

The invention thus relates to a process for the study of chemical reactions in the presence of potentially catalytic substances, in which the reactions are carried out in parallel in reactors, characterized in that the reactions are carried out in miniaturized reactors and the reaction mixture is analyzed with respect to nature and amount during the reaction period.

The invention further relates to an apparatus, in particular for carrying out this process, the apparatus having a plurality of parallel-connected reactors which are provided with feedlines and discharge lines, characterized in that the reactors are miniaturized, at a volume from the range from $0.001$ $cm^3$ to $1$ $cm^3$.

Particular embodiments or developments of the invention result from the corresponding subclaims. Individual or a plurality of individual features mentioned in the claims can also each themselves represent solutions of the invention, and the features within the claim categories can also be combined as desired.

A particular embodiment of the process according to the invention is characterized in that the reaction starting materials are fed continuously to the reactors and the reaction products are discharged continuously from the reactors. However, the batch mode of operation is equally possible.

A further particular embodiment is characterized in that use is made of starting materials which are at least in part labeled with isotopes, preferably with deuterium ($^2H$) or heavy oxygen ($^{18}O$) or heavy carbon ($^{13}C$) or mixtures thereof. These generate characteristic spectral shifts in rotation-vibration spectra, which, in addition to labeling the reaction pathway, owing to starting material mixed variants, can lead to novel interesting reactions or reaction products and relatively small by-product contents can be contrasted systematically.

Individual reactors or reactors combined to form groups can also be fed with different starting material mixtures, in order to reveal or detect any synergies present in this manner using the methods of combinatory chemistry.

The starting material mixtures, reaction mixtures or product mixtures can be analyzed with respect to nature and amount of the substances present at any time points of the course of the reaction by spectroscopic analysis, preferably by infrared spectroscopy (IR), particularly preferably by Fourier IR spectroscopy. Other spectroscopic methods, such as laser spectroscopy or UV spectroscopy, are equally suitable for the study. The process can be carried out at differing temperatures and pressures, at temperatures of the range from $-50°$ C. up to and including $600°$ C., preferably from room temperature to $500°$ C., or at various pressures, at absolute pressures from $10^{-3}$ to $10^3$ bar, preferably from $10^{-2}$ to $200$ bar. The data obtained can then be supplied to a comprehensive parametric and data analysis.

The invention is further characterized in that the reactions can be carried out in the presence of a heterogeneous or homogeneous catalyst and in that it is possible to screen the catalytic activity (ie. product detection) and selectivity (main product distribution) of catalyst amounts less than 10 mg, preferably less than 1 mg, in a reactor.

In a particular embodiment of the apparatus according to the invention, a plurality of miniaturized reactors separated from one another can be disposed in a block. The volume of these reactors can be in the range from $0.001$ $cm^3$ to $1$ $cm^3$, preferably from $0.01$ $cm^3$ to $0.5$ $cm^3$, particularly preferably from $0.05$ $cm^3$ to $0.2$ $cm^3$. In a further preferred embodiment of the apparatus according to the invention, the reactors are disposed as a square or rectangular pattern in a metal block, which can be parallelepipedal or cubic. The metal block can be provided with heating block elements or cooling elements and can be fitted with a temperature sensor in the vicinity of each reactor. This makes monitored and reproducible temperature control possible. For example, by this means, a defined temperature gradient can be set over the metal block. The reactors are advantageously disposed in a plane which is parallel to a surface of the parallelepiped. Advantageously, at least some of the feedlines and discharge lines of the individual reactors are perpendicular to this plane. They can be designed as through-holes in the metal block. The reactors can be designed as boreholes. The number of reactors in one block can be greater than 20, preferably greater than 40, particularly preferably greater than 100, very particularly preferably greater than 200. Using these reactors, under defined reaction conditions, a small amount of potential catalysts (also termed samples below) can be brought into contact and reacted in parallel, ie. simultaneously, with starting material or starting material mixtures in liquid and/or gaseous form batchwise or continuously. Automation of the apparatus according to the invention is possible, in particular charging the reactors with catalysts can proceed automatically, preferably by a laboratory robot or a pipetting machine.

In a further preferred embodiment, the miniaturized reactors are designed in the metal block as 4 mm bore holes and disposed in such a manner that differing starting material and inert gases can flow through them through 2.5 mm capillary bore holes. The gases then pass into a spacer, preferably a distancing plate, which is mounted on the metal block and in which the bore holes of the metal block continue. The arrangement of metal block and spacer is provided with a customary cuvette bore hole in which the gases can be analyzed by spectroscopy. For this purpose, the bore hole is sealed at both ends with a transparent window. If infrared spectroscopy is to be used for analysis, use is preferably made of windows of 1-1-1 silicon, NaCl, KBr, Ge, ZnSe or KSR5. For the analysis, a collimated analytical beam, in the case of IR spectroscopy an infrared beam, is decoupled from an interferometer, preferably without a mirror, and directed through a dry-gas-flushed space through the cuvette bore hole onto a detector situated behind. The cuvette bore hole can be, for example, 5 mm thick. By choosing a suitable thick spacer, the length of the cuvette bore hole can be chosen between a few cm (1–10) and several 10 s of cm (10–50), depending on the reaction conditions and reaction type. To record the spectra, the analytical beam can be directed through all cuvette bore holes successively by a deflection apparatus. However, a plurality of beams or a plurality of analyzers can also be used, so that simultaneous recording of spectra is possible with a plurality of reactors. However, equally, the block containing the reactors can be moved by motion devices, for example stepper motors, in such a manner that all cuvette bore holes are brought successively into the beam path of the spectrometer. Suitable materials for block and spacer are preferably the customary corrosion-resistant metallic materials familiar to those skilled in the art, particularly aluminum or steel, preferably stable to rust and/or acid and/or high temperature.

A further embodiment of the apparatus according to the invention which is particularly suitable for homogeneous catalysis is characterized in that, in the case of at least one reactor having a volume which is preferably less than 200 $\mu$l, an ATR crystal (attenuated total reflection spectroscopy, preferably conically pointed, preferably made of ZnSe or KSR5 or diamond) makes possible spectroscopic contact with the reaction mixture for differing solvents and reaction conditions and pressures up to 200 bar. In this case, the analytical beam is focused onto the ATR crystal.

The advantages of the process according to the invention and the apparatus according to the invention are essentially that a multiplicity of reactions can be carried out rapidly, inexpensively and reproducibly under virtually identical conditions and with comparatively small amounts of substance and sample and, in the course of this, can simultaneously be studied spectroscopically. It thus offers the opportunity of using the opportunities discussed in connection with combinatorial chemistry (K. Burgess et al., Ang. Chem. 1996, 108, 2, 192, incorporated by reference into the application) for industrial catalyst screening. By choosing identical samples and differing other reaction conditions such as temperature, pressure, starting material composition, a parallel reaction optimization can be carded out.

To analyze the data obtained, advantageously, a data matrix is prepared in such a manner that all selectable and documentable reaction conditions (starting material partial pressures, starting material composition, temperature, flow or flow rate, total pressure, sample composition, sample lattice parameters and all base points of the spectra) are given according to reaction conditions, ie. for each reactor, as columns of the matrix. This matrix can be subjected to a factor analysis (E. R. Malinowski et al., Factor Analysis in Chemistry, Wiley, New York, 1980, incorporated by reference into the application), by calculating the covariance matrix, the eigenvalues, the abstract eigenvectors, the loadings and the coefficients of the multidimensional regression, and preferably outputting them as files. A (pre)normalization of the data can also be selected by the mean "0" and standard deviations "1", which can avoid base line effects or absolute effects. This permits the prediction of differing variables from calibration data sets (eg. quantitative $CO_2$ contents at different temperatures), determination of the dependence of parameters in spectral ranges to optimization of the analysis, generation of different distance matrices from the output data (for example the similarity of catalysts with respect to selected variables and properties) and direct feedback of the catalyst composition to a laboratory robot synthesizer which mixes a set of new catalyst samples and synthesizes them "automatically" by sintering or calcining on a robot line.

An embodiment of the process according to the invention and a development of the apparatus according to the invention are described in more detail below with reference to FIGS. 1 and 2, without the intention of restricting the invention in any manner.

In the Figures

FIG. 2 shows an individual reactor 2 from the apparatus 1 according to the invention in side view; and FIG. 3 is a graph of wave number versus absorption.

Figure 1:
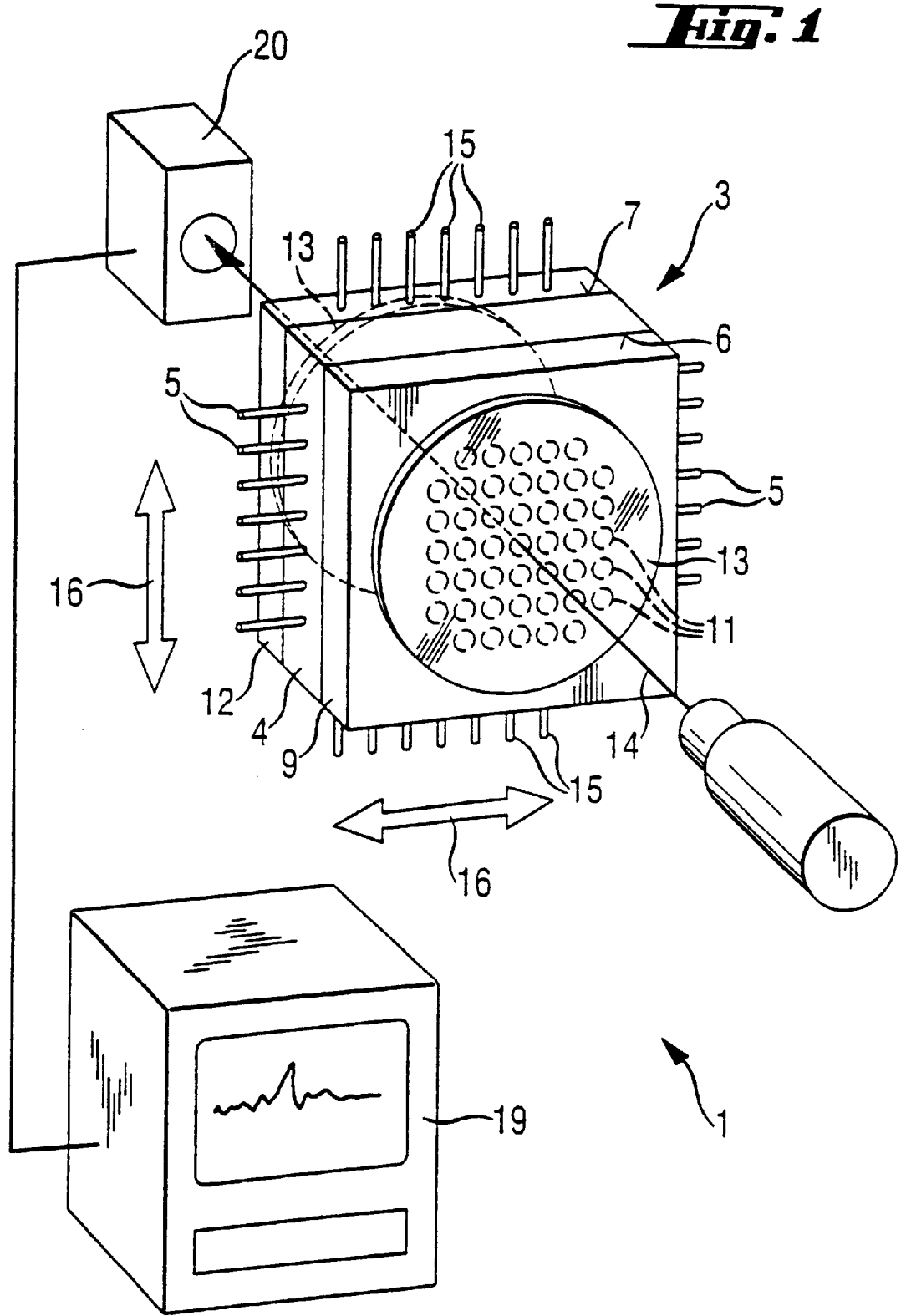
FIG. 1 shows a diagrammatic representation of the apparatus 1 according to the invention in the beam path of a spectroscopic analyzer.

An apparatus 1 for the study of chemical reactions essentially consists of a block-shaped arrangement 3 of miniaturized reactors 2. The block-shaped arrangement 3 is designed in such a manner that the reactors 2 are incorporated in the form of bore holes in a parallelepipedal metal block 4, which has a front side 6 and a rear side 7. The reactors 2 are sunk into the front side 6 of the parallelepipedal metal block 4 and arranged in a rectangular pattern. They are connected to bore holes 5 for feeding the starting materials. Catalysts 8 are introduced into the reactors 2. Onto the front side 6 is mounted, as spacer, a distancing plate 9, in which the reactors 2 continue as bore holes. From these lead further bore holes 10 which serve to discharge the reaction products to a cuvette bore hole 11. On the rear side 7 is arranged, as further spacer, a distancing plate 12. The cuvette bore hole 11 continues through the metal block 4 through the distancing plate 12. It is closed on the open surfaces of the distancing plate by transparent windows 13 and serves for discharging the reaction products and simultaneously as a space for their spectroscopic analysis by means of an IR beam 14. The reaction products, coming from the reactor 2, are passed through the bore holes 10,11, in accordance with the indicated arrows. From the end of the cuvette bore hole 11 in the distancing plate 12, they are discharged via bore holes 15. In the vicinity of the reactors 2, heating elements 17 and thermocouples 18 are incorporated into the metal block 4. The block-shaped arrangement 3 can be moved by stepper motors 16 in both spatial directions perpendicular to the IR beam 14. By this means, every cuvette bore hole 11 belonging to one of the reactors 2 can be moved into the IR beam. The IR beam is analyzed by recording the interferogram by means of an interferometer 20 and detector 19 which are arranged close to the transparent windows 13.

An experimental example using a known catalyst is described below.

In the apparatus according to the invention, in the reactors of the reactor block, a mixture of 30.2% by volume of propylene 2.5, 15.2% by volume of oxygen 4.5, the remainder nitrogen 5.0 impinged differing solids. One of the reactors comprised a small amount (5 mg) of a known industrial catalyst for the oxidation of propylene to acrolein. The IR spectra of all reaction gases were recorded completely automatically at different temperatures. FIG. 3 shows the spectrum of the reaction gas from the reactor which contains the known catalyst at 400 and 450° C. at 400° C. the product (acrolein from oxygen and propylene) can already be detected. However, much carbon dioxide was still formed. At 450° C., carbon dioxide was no longer observed, and the product yield had increased. (The slightly negative strip was the result of referencing and indicates the base line accuracy in this experiment.)

It was thus found that a catalyst activity for a specific reaction can be detected and optimized fully automatically.

What is claimed is:

1. Process for the study of chemical reactions in the presence of catalytic substances in which the reactions are carried out in parallel in reactors, providing each reactor with feed and discharge lines and in that the feed lines or discharge lines or the reactors are at least in part transparent to analytical radiation, the process comprising the steps of carrying out a chemical reaction in the presence of a catalyst in a plurality of individual reactors, each having a volume in the range of 0.001 $cm^3$ to 1 $cm^3$, to produce a reaction mixture in each reactor, including the steps of continuously feeding reaction starting materials to the reactors through the feeding lines and continuously discharging product from the reactors through the discharge lines, and spectroscopically analyzing each reaction mixture during the reaction period.

2. Process according to claim 1, wherein the reactions are carried out at differing temperatures or at differing pressures.

3. Process according to claim 1 wherein the catalysts are heterogeneous or homogeneous catalysts.

4. Process according to claim 3, wherein the amount of catalyst per reactor is <10 mg.

5. Process according to claim 1, wherein each reaction mixture is analyzed spectroscopically with respect to nature and amount of its constituents.

6. Process according to claim 1, wherein the reactions are carried out in more than 20 reactors.

7. Process according to claim 5, wherein spectroscopic analysis is carried out on all reactors simultaneously by using an appropriate number of analyzers, or wherein the spectroscopic analysis is carried out on the reactors one after the other by directing an analysis beam onto the individual reactors in succession.

8. Process according to claim 1, including the step of using starting materials, at least some of which are labeled by isotopes.

9. Process according to claim 1, including the step of feeding the plurality of individual miniature reactors with differing starting material mixtures.

* * * * *